United States Patent [19]

Brack

[11] 4,396,768

[45] Aug. 2, 1983

[54] PROCESS FOR THE PREPARATION OF ANIONIC QUINOPHTHALONE DYESTUFFS

[75] Inventor: Alfred Brack, Odenthal, Fed. Rep. of Germany

[73] Assignee: Bayer Aktiengesellschaft, Leverkusen, Fed. Rep. of Germany

[21] Appl. No.: 269,238

[22] Filed: Jun. 1, 1981

[30] Foreign Application Priority Data

Jun. 19, 1980 [DE] Fed. Rep. of Germany ....... 3022837

[51] Int. Cl.$^3$ ............................................ C09B 25/00
[52] U.S. Cl. ................................................... 546/167
[58] Field of Search ............... 546/167, 154, 173, 101; 8/604, 658

[56] References Cited

U.S. PATENT DOCUMENTS

| | | | |
|---|---|---|---|
| 2,092,238 | 9/1937 | Bailey | 546/173 X |
| 3,152,132 | 10/1964 | Clarke | 546/167 |
| 3,301,860 | 1/1967 | Clarke | 546/167 X |
| 3,872,131 | 3/1975 | Wallace | 546/154 |

FOREIGN PATENT DOCUMENTS 1268170  3/1972  United Kingdom ................ 546/154

*Primary Examiner*—Donald G. Daus
*Assistant Examiner*—Diana G. Rivers
*Attorney, Agent, or Firm*—Sprung, Horn, Kramer & Woods

[57] ABSTRACT

Quinophthalone dyestuffs containing sulpho groups are obtained in a particularly advantageous manner by reacting a corresponding quinaldine derivative with a phthalic anhydride at 160°–240° C. in quinoline.

2 Claims, No Drawings

PROCESS FOR THE PREPARATION OF ANIONIC QUINOPHTHALONE DYESTUFFS

It is known, for example from U.S. Pat. Nos. 3,152,132 and 3,301,860, that anionic quinophthalone dyestuffs can be prepared by condensation of quinaldine derivatives containing sulpho groups with phthalic anhydride. However, this condensation takes place only in certain solvents, preferably those of the aliphatic or alicyclic acid amide type, such as dimethylformamide, dimethylacetamide and N-methylpyrrolidone. These solvents, however, decompose under the conditions of the condensation, in some cases with the formation of toxic degradation products, such as carbon monoxide. At the same time, the free amines on which the amide is based, such as dimethylamine, are formed, as a result of which the waste air and, after working up of the condensation batch, the effluent become polluted. Moreover, the effluent obtained in the known processes—for example by the procedure of Example 1 from U.S. Pat. No. 3,152,132—contains all the solvent, which remains undecomposed, and the excess phthalic anhydride or secondary products thereof, such as phthalic acid monodimethylamide. The obtaining of such highly polluted effluents, which are unsuitable for working up in the sense of a "recycling process", represents a decisive disadvantage of the processes already known.

It has now been found that the condensation of the quinaldine derivatives containing sulpho groups can be carried out in a very advantageous manner in quinoline.

In this solvent, the quinophthalone dyestuffs are formed in a very pure form and in excellent yields. The quinoline can easily be washed out completely from the dyestuffs, which are obtained as crystals, using solvents such as methanol, ethanol, isopropanol or acetone. The solvents are recovered by simple distillation, and are used again. Neither toxic, gaseous degradation products nor any effluents are formed; the residue which remains when the quinoline is recovered by distillation can be destroyed by combustion without problems, or can also be worked up again to give phthalic acid (derivatives). All the environment-polluting disadvantages of the processes already known are thus eliminated.

Anionic quinophthalone dyestuffs can also be prepared from sulphonated phthalic anhydride or from sulphophthalic acid and quinaldine derivatives which are free from sulphonic acid groups. The new process can likewise advantageously be employed in this case. Finally, it is also possible for both components to contain sulphonic acid groups.

Suitable quinaldine derivatives containing sulphonic acid groups are, for example: quinaldine-5-, -6-, -7- and -8-sulphonic acid and the compounds:

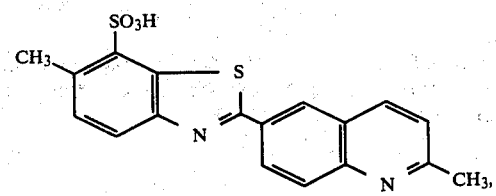

-continued

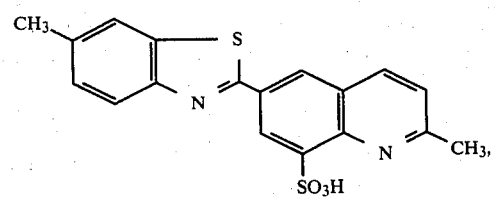

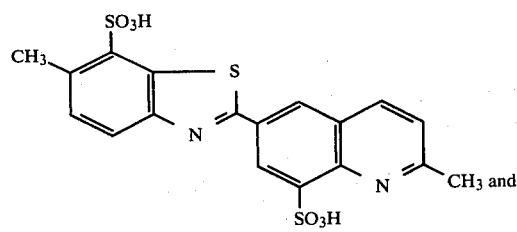

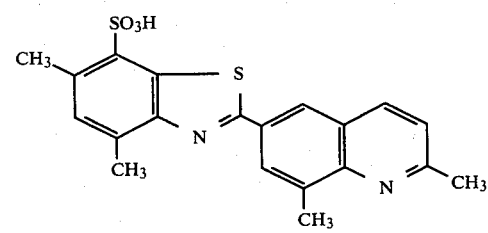

The condensation is carried out by heating the components to 160°–240° C., preferably 180°–220° C. The dyestuffs thus prepared are readily soluble, without giving a residue, in aqueous solutions of polyoxyethylated amines. These solutions are stable at low temperatures and easy to handle. They contain the corresponding amine salts of the dyestuffs and, if appropriate, excess amine. Particularly concentrated solutions can be prepared with the amine of the formula

and its quaternary base of the formula

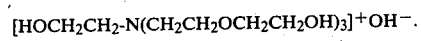

The parts given in the examples are parts by weight.

EXAMPLE 1

328 parts of the compound of the formula

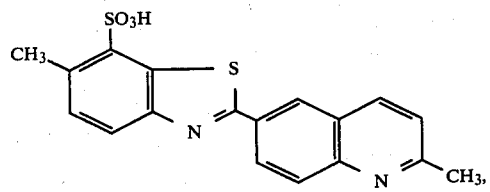

660 parts of phthalic anhydride and 1,000 parts of technical grade quinoline are heated to 200° C. for 20 hours, whilst stirring. After cooling the mixture, 1,000 parts of ethanol are allowed to run in. The mixture is stirred until it is homogeneous and is then filtered. The dyestuff, which is obtained as crystals, is washed with 1,000 parts of alcohol. 529 parts of dyestuff which, for example, can be employed for dyeing paper in a very clear greenish-tinged yellow shade are obtained. Alcohol and quinoline are recovered from the filtrate by distillation.

The dyestuff is particularly readily soluble in aqueous solutions of poly-oxyethylated amines, such as solutions of [N(CH$_2$CH$_2$OH)$_4$]OH, N(CH$_2$CH$_2$OCH$_2$CH$_2$OH)$_3$ and [HOCH$_2$CH$_2$-N(CH$_2$CH$_2$OCH$_2$CH$_2$OH)$_3$]OH, A liquid dyestuff formulation which is stable at low temperatures is obtained when 80 parts of the dyestuff prepared as described above are dissolved in 250 parts of water and 150 parts of the amine of the formula N(CH$_2$CH$_2$OCH$_2$CH$_2$OH)$_3$.

If the procedure followed is as according to this process example, using 345 parts of the compound of the formula

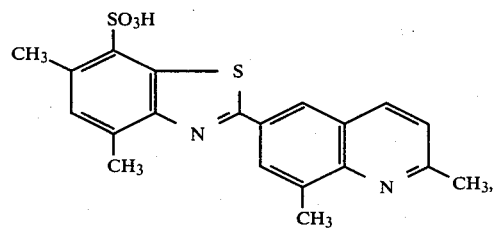

the dyestuff of the formula:

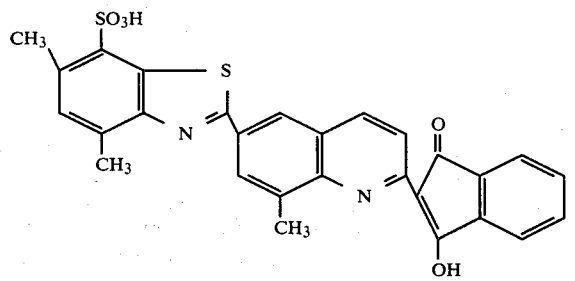

which is very similar from a coloristic point of view, is obtained equally smoothly.

EXAMPLE 2

37 parts of the quinaldine derivative used in Example 1, 40 parts of the mono-potassium salt of 4-sulphophthalic acid and 150 parts of quinoline are heated to 190° C. for 15 hours. After cooling the mixture, the dyestuff

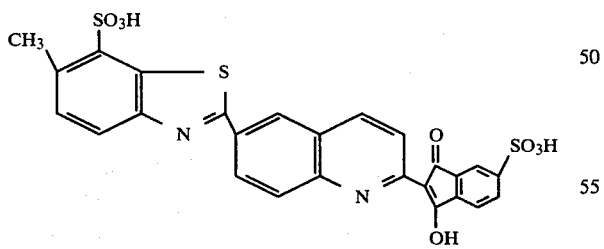

which has separated out is filtered off and washed with alcohol. The crude product can be purified by boiling up with 2,000 parts of water. When 100 parts of concentrated hydrochloric acid are added to the filtrate, the pure dyestuff separates out in the form of crystals. It gives clear, greenish-tinged yellow dyeings on wool, polyamide and paper and corresponds to the above formula.

EXAMPLE 3

37 parts of the quinaldine derivative used in Example 1, 22 parts of trimellitic anhydride and 100 parts of quinoline are heated to about 200° C. for 15 hours. After cooling the mixture, it is diluted with 120 parts of alcohol. The dyestuff of the formula

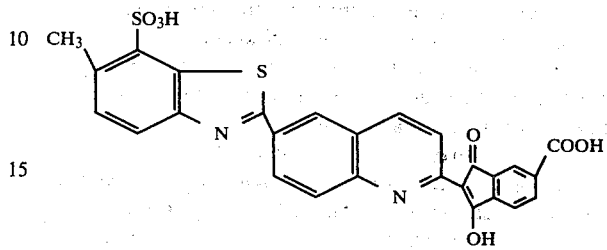

which has separated out is filtered off and washed with 100 parts of alcohol. 50 parts of cyrstalline dyestuff which, like the product of Example 1, can be converted into a liquid formulation which is stable at low temperatures, and which gives somewhat less greenish-tinged yellow dyeings are obtained.

I claim:

1. Process for the preparation of anionic quinophthalone dyestuffs of the formula

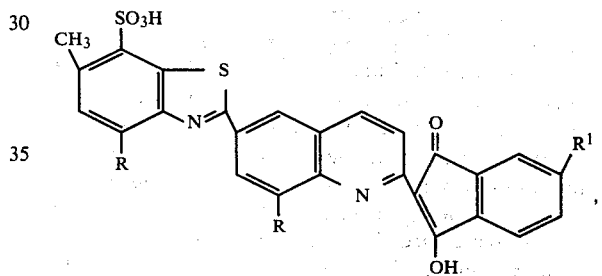

wherein
R represents hydrogen or methyl and
R$^1$ represents hydrogen or the carboxyl or sulphonic acid group, characterised in that a quinaldine derivative of the formula

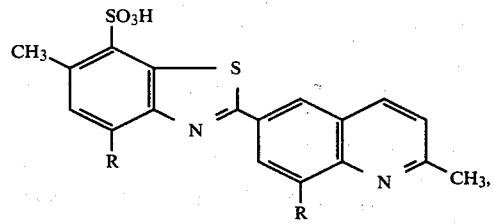

wherein
R denotes hydrogen or methyl,
is subjected to a condensation reaction with phthalic anhydride, trimellitic anhydride, 4-sulpho-phthalic anhydride or 4-sulpho-phthalic acid in quinoline at 160°-240° C.

2. Process for the preparation of anionic quinophthalone dyestuffs of claim 1 wherein the condensation reaction is carried out at 180°-220° C.

* * * * *